United States Patent [19]

Matsuda et al.

[11] 4,016,120
[45] Apr. 5, 1977

[54] AQUEOUS CATIONIC POLYURETHANE HAVING BLOCKED NCO GROUPS AND PROCESS

[75] Inventors: Kazuo Matsuda; Hidemasa Ohmura; Takeyo Sakai, all of Wakayama, Japan

[73] Assignee: Kao Soap Co., Ltd., Tokyo, Japan

[22] Filed: July 12, 1976

[21] Appl. No.: 704,612

[30] Foreign Application Priority Data

July 28, 1975 Japan .............................. 50-91805

[52] U.S. Cl. .................. 260/29.2 TN; 260/75 NK; 260/77.5 AP; 260/77.5 TB

[51] Int. Cl.$^2$ ...................... C08G 18/80; C08J 3/06

[58] Field of Search ............ 260/29.2 TN, 29.2 EP, 260/29.2 N, 75 NH, 77.5 TB, 77.5 AM

[56] References Cited

UNITED STATES PATENTS

| | | | |
|---|---|---|---|
| 3,723,372 | 3/1973 | Wakimoto et al. | 260/29.2 TN |
| 3,799,854 | 3/1974 | Jerabek | 260/29.2 TN |
| 3,836,493 | 9/1974 | Matsuda et al. | 260/29.2 TN |
| 3,897,377 | 7/1975 | Broecker et al. | 260/29.2 TN |
| 3,903,031 | 9/1975 | Matsuda et al. | 260/29.2 TN |
| 3,903,032 | 9/1975 | Matsuda et al. | 260/29.2 TN |
| 3,928,271 | 12/1975 | Matsuda et al. | 260/29.2 TN |
| 3,932,561 | 1/1976 | Zamer | 260/29.2 TN |
| 3,947,338 | 3/1976 | Jerabek et al. | 260/29.2 TN |
| 3,951,897 | 4/1976 | Matsuda et al. | 260/29.2 TN |

*Primary Examiner*—Murray Tillman
*Assistant Examiner*—Arthur H. Koeckert
*Attorney, Agent, or Firm*—Woodhams, Blanchard and Flynn

[57] ABSTRACT

Aqueous cationic polyurethane emulsions are prepared by reacting an isocyanate-terminated urethane prepolymer with an excess of a polyalkylene polyamine to form a polyurethane-urea-polyamine, and then partially reacting the free amino groups in said product with a blocked polyisocyanate having a single free isocyanate group, followed by mixing with an aqueous solution of an acid.

8 Claims, No Drawings

AQUEOUS CATIONIC POLYURETHANE HAVING BLOCKED NCO GROUPS AND PROCESS

BACKGROUND OF THE INVENTION

1. Field of the Invention

The present invention relates to a process for preparing a polyurethane emulsion, and more specifically relates to a process for preparing a homogeneous, stable, cationic, self-emulsifiable, polyurethane aqueous emulsion.

2. Description of the Prior Art

Various processes are known for preparing polyurethane emulsions, for example, by obtaining a urethane prepolymer having terminal isocyanate groups from a polyhydroxy compound and an excess of an organic polyisocyanate, chain-extending said urethane prepolymer using a chain extender which contains a tertiary amino group thereby to obtain a polyurethane composition containing a tertiary amino group, quaternizing said tertiary amino group, followed by mixing with water, or mixing with an aqueous solution of acid, in order to prepare a so-called self-emulsifiable polyurethane emulsion which does not contain an emulsifier.

Another process of preparing a polyurethane emulsion consists of, for example, dispersing a polyurethane composition in water in the presence of an emulsifier.

Polyurethane resins, in general, have excellent physical and chemical properties. But the polyurethane resin films obtained from a polyurethane emulsion prepared by the aforesaid conventional processes exhibit relatively poor physical and chemical properties as compared to the crosslinked polyurethane resins, because it is difficult to effect chemical crosslinking of the polymers, and the emulsifier remaining in the polyurethane resin causes the resin to exhibit considerably poor properties.

Polyurethane polymers having firm crosslinking, usually, are very difficult to handle in the preparation steps because of their poor melting and poor solubility properties, and in many cases, handling is quite impossible. Therefore, it is almost impossible to prepare emulsions by dispersing such polymers in water. Even if they are dispersed in water, the polyurethane emulsions thus prepared often tend to be very unstable.

SUMMARY OF THE INVENTION

We have discovered a process of preparing an aqueous emulsion containing a polyurethane resin and having good physical and chemical properties, without introducing crosslinked bonds into the resin before the urethane resin is dispersed in water, and without increasing the molecular weight of the polymer so much as to decrease the stability of the emulsion, and without using large amounts of an emulsifier. Our invention provides a self-emulsifiable polyurethane emulsion having a functional group which is capable of forming crosslinkages.

According to our invention, there is introduced into a polyurethane resin in the form of an aqueous emulsion, an isocyanate generating compound (blocked isocyanate) which is effective as a reactive functional group that can form crosslinks when the urethane resin is heat-treated.

We have succeeded in obtaining a stable, cationic, self-emulsifiable and self-crosslinkable emulsion containing a polyurethane resin having excellent physical and chemical properties, by reacting (A) an isocyanate-terminated urethane prepolymer prepared from a polyhydroxy component and an excess of a polyisocyanate, with (B) an excess of a polyalkylene polyamine, to form a polyurethane-urea-polyamine, and then partially reacting the free amino groups in said product with a blocked polyisocyanate having a single free isocyanate group, followed by mixing the latter product with an aqueous solution of an acid.

The polyurethane resin obtained by drying a polyurethane emulsion obtained by the present invention, undergoes a thermosetting reaction when it is heated whereby to form crosslinkages, thereby improving the properties of the polyurethane resin. Therefore, there is no need to maximize the molecular weight of the polymer in the emulsion to improve the properties of the polyurethane resin and, accordingly, the emulsion exhibits a very good stability.

The polyurethane-urea-polyamine used for the preparation of the composition of the present invention is obtained by reacting (A) an isocyanate-terminated urethane prepolymer, which is prepared from a polyhydroxyl component and an excess of polyfunctional isocyanate, with (B) a polyalkylene polyamine, preferably in a solvent of the ketone-type, such as acetone or methylethyl ketone.

Examples of polyfunctional isocyanates are aromatic and aliphatic diisocyanates, such as 1,5-naphthylenediisocyanate, 4,4'-diphenylmethanediisocyanate, 4,4'-diphenyldimethylmethanediisocyanate, di- and tetra-alkyldiphenylmethanediisocyanates, 4,4'-dibenzylisocyanate, 1,3-phenylenediisocyanate, 1,4-phenylenediisocyanate, tolylenediisocyanate, chlorinated isocyanates, brominated isocyanates, phosphorus-containing isocyanates, butane-1,4diisocyanate, hexane-1,6-diisocyanate, dicyclohexylmethanediisocyanate, cyclohexane-1,4-diisocyanate, xylylenediisocyanate and lysinediisocyanate. In addition, triisocyanates, such as 1-methyl-benzole-2,4,5-triisocyanate, biphenyl-2,4,4'-triisocyanate, and triphenylmethanetriisocyanate can be used in combination with the foregoing diisocyanates.

The polyhydroxyl compound that is used for the preparation of the urethane prepolymer that is used in the present invention has a molecular weight of 200 to 10,000. Examples of known polyhydroxyl compounds conventionally used for the preparation of polyurethanes are polyethers, polyesters, polyesteramides, polyacetals, polythioethers, and polybutadiene glycols.

Examples of the polyethers are homopolymers, copolymers and graft copolymers of tetrahydrofuran, ethylene oxide, propylene oxide and butylene oxide.

It is also possible to use homogeneous polyethers or mixed polyethers formed by condensation of hexanediol, methylhexanediol, heptanediol, or octanediol.

There can also be used propoxylated or ethoxylated glycols, as well as glycols such as bisphenol A or adducts of bisphenol A with an alkylene oxide such as ethylene oxide or propylene oxide.

Examples of the preferred polythioethers are thioglycol alone, or a condensation product of thioglycol with other glycols.

Examples of the polyacetals are water-insoluble polyacetals obtained, for example, from hexanediol and formaldehyde, or from 4,4'-dioxyethoxydiphenyldimethylmethane and formaldehyde.

Typical examples of the polyesters are polyester glycols obtained by the dehydration condensation reaction of saturated and unsaturated low molecular weight glycols such as ethylene glycol, propylene glycol, 1,3-butanediol, 1,4-butanediol, neopentyl glycol, pentanediol, hexanediol, octanediol, 2-ethyl-1,3-hexanediol, 1,4-butynediol, bisphenol A, diethylene glycol, triethylene glycol, dipropylene glycol, and bisphenol A adducted with ethylene oxide or propylene oxide, and aliphatic, alicyclic, aromatic and heterocyclic saturated and unsaturated dibasic acids such as oxalic acid, malonic acid, succinic acid, glutaric acid, adipic acid, pimelic acid, azelaic acid, sebacic acid, phthalic acid, maleic acid, and fumaric acid, as well as polyester glycols obtained by the ring-cleavage polymerization of the cyclic ester compounds.

Also, if required, the aforesaid polyhydroxyl compound can be used together with customarily used glycols, such as ethylene glycol, diethylene glycol, triethylene glycol, butanediol, propanediol, 1,6-hexanediol, neopentyl glycol, and N-alkyldiethanolamine having $C_1$ to $C_{22}$ to alkyl group.

The isocyanate-terminated urethane prepolymer used in the present invention is prepared in the presence or absence of a solvent. When an aromatic polyisocyanate is used for reaction with the polyhydroxyl compound, the reaction temperature is within a range of 50° to 100° C, and when an aliphatic and an alicyclic polyisocyanate is used, the reaction temperature is within a range of 70° to 130° C.

In preparing the isocyanate-terminated urethane prepolymer, it is preferred to select the amount of the polyisocyanate so that all the hydroxyl groups are reacted with the isocyanate groups. The ratio of the total number of moles of the isocyanate groups to the total number of moles of the reactive hydrogen atoms (OH groups) should preferably be 1.1 : 1.0 to 5.0 : 1.0.

Examples of the polyalkylene polyamines used in the present invention are various polyalkylene polyamines including polyethylene polyamine, polypropylene polyamine and polybutylene polyamine.

More specifically, the polyalkylene polyamine used in the present invention is a polyamine in which the nitrogen atoms are bonded by a group of the formula $-C_nH_{2n}-$, wherein $n$ is an integer larger than 1, and in which from 2 to about 4 such groups are contained in the molecule. The nitrogen atoms can be bonded to the adjacent carbon atoms in the group $-C_nH_{2n}-$ group, but they are not bonded to the same carbon atoms. In short, the polyamines have the following formula

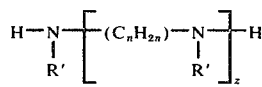

wherein $n$ is an integer larger than 1, $z$ is an integer of 2 to 4, $R'$ is hydrogen, alkyl having 1 to 4 carbon atoms, or hydroxyalkyl ($C_1$–$C_4$) group.

Specifically, there can be used not only the polyamines such as diethylenetriamine, triethylenetetraamine, tetraethylenepentaamine and dipropylenetriamine, but also mixtures thereof and various polyamine materials. It is also possible to use hydroxyalkyl-substituted polyamines.

In some cases in order to change the density of the hydrophilic groups in the polyurethane emulsion obtained by the present invention, or to improve the performance of the polyurethane resin, it is desired to increase the distance between the amino groups in the polyurethane-urea-polyamine molecules. This can be attained by replacing part of the polyalkylene polyamine with a hydrazine, ethylenediamine, propylenediamine, hexamethylenediamine, piperazine, phenylenediamine, and their alkyl ($C_1$–$C_{22}$) substituted diamines, alkylene oxide adducts of these diamines, acrylonitrile adducts of these diamines and acrylic ester adducts of these diamines.

To attain the above object, usually less than about 50% of the polyalkylene polyamine can be replaced by the aforementioned diamines.

It is preferred that the reaction between the isocyanate-terminated urethane prepolymer and the polyalkylene polyamine, is conducted under atmospheric pressure in a solvent of the ketone-type and at a reaction temperature ranging from −20° to +70° C.

Examples of the ketone-type solvents are acetone, methylethyl ketone, diethyl ketone, dipropyl ketone, methylisobutyl ketone, and methylisopropyl ketone. Acetone and methylethyl ketone are preferred.

The ketone-type solvent can contain a minor amount of benzene, tetrahydrofuran, dioxane, acetic acid ester, dimethyl formamide and chlorinated hydrocarbon solvent.

The reaction time is determined by the reaction temperature and the reactivity of the polyisocyanate compound. The reaction time can be shorter or longer depending upon the reaction conditions. Completion of the reaction is confirmed when no absorption due to the isocyanate group is observed at 2250 cm$^{-1}$ in the infrared absorption spectrum. The reaction time usually ranges from 0.5 to 2 hours.

In reacting the urethane prepolymer with the polyalkylene polyamine, it is critical that the total number of the primary and secondary amino groups exceeds the total number of the isocyanate groups in the urethane prepolymer. As the total mole number of the amino groups becomes close to the total mole number of the isocyanate groups, there tends to be formed a polyurethane-urea-polyamine of higher molecular weight, and a gelled product or a product that exhibits a high tendency of gellation is obtained. Also, if the mole number of the amino groups is excessive, the resulting polyurethane-urea-polyamine has a low molecular weight. It is not possible to obtain resins having excellent properties when the polyurethane emulsion is prepared using such products as an intermediate.

Accordingly, the ratio of the total number (B) of the moles of primary and secondary amino groups to the number of moles (A) of the isocyanate is $$1 < \frac{B}{A} \leq 5$$

and preferably, $$1 < \frac{B}{A} \leq 3.$$

Preferably, the molecular weight of the polyurethane-urea-polyamine is from 5000 to 100,000.

The blocked polyisocyanate having a single free isocyanate group is obtained by the reaction of polyisocyanates with various isocyanate blocking agents. To impart the crosslinking property to the urethane resin in the polyurethane emulsion prepared by using the above-obtained polyurethane-urea-polyamine as an intermediate, the blocked polyisocyanate having a single free isocyanate group is reacted with the free amino groups in said intermediate. Preferred examples of the polyisocyanates used to prepare the blocked polyisocyanates are the aforementioned isocyanate-terminated urethane prepolymers and the polyisocyanates described above used for the preparation of the urethane prepolymer.

Examples of the isocyanate blocking agents are sulfites such as potassium hydrogen sulfite, sodium hydrogen sulfite; secondary amines such as diethylamine, dibutylamine, diphenylamine, butylphenylamine, phenylnaphthylamine; tertiary alcohols such as tertiary-butyl-alcohol; amides such as stearic acid amide, acetic acid amide, acrylamide, acetanilide; phenol derivatives such as ethylphenol, t-butylphenol, hydroxybenzoic acid; lactams such as є-caprolactam, δ-valerolactam, γ-butyrolactam, β-propiolactam; oximes such as methylethylketoxime, benzophenoneoxime, cyclohexanoneoxime, acetaldoxime, acetoxime; imides such as maleic acid imide, succinic acid imide, phthalic acid imide; mercaptans such as t-dodecylmercaptan, t-butylmercaptan, butylmercaptan, hexylmercaptan; active methylene compounds such as dimethyl malonate, diethyl malonate, methyl acetoacetate, ethyl acetoacetate, acetylacetone; and hydrogen cyanide, ethylene imine, glycidol, hydroxyamine, and pyrrolidone.

The polyisocyanate is reacted with an isocyanate blocking agent, usually in the presence or absence of a solvent, at a temperature of 20° to 150° C, for a period of 0.5 to 7 hours. It is important to select the amount of the isocyanate blocking agent so that one isocyanate group is left free in each molecule of the polyisocyanates. That is, it is possible to easily prepare a blocked polyisocyanate having one free isocyanate group by reacting about (P-1) mole of an isocyanate blocking agent with one mole of a polyisocyanate having P units of free isocyanate groups in one molecule.

The thus-prepared blocked polyisocyanates having one free isocyanate group are reacted with the free amino groups in the polyurethane-urea-polyamine. This reaction is preferably conducted at $-20°$ to $+70°$ C for a period of 0.5 to 2 hours. The amount of said blocked polyisocyanate is in the range of from 0.1 to 0.7 moles of free isocyanate in said blocked polyisocyanate, per one mole of the sum of the primary and secondary amino groups in said polyurethane-urea-polyamine.

To the thus-obtained polyurethane-urea-polyamine having a blocked isocyanate group there is mixed an aqueous solution of an acid to obtain a cationic self-emulsifiable polyurethane emulsion, and the organic solvent used for the reaction is heated and distilled off. Distillation of the solvent does not impair the stability of the emulsion.

The aqueous acid solution used in the present invention can be either an inorganic acid aqueous solution or an organic acid aqueous solution. Particularly preferred examples of the acids are monobasic acids such as hydrochloric acid, nitric acid, acetic acid, propionic acid, monochloroacetic acid and glycolic acid. The acid should preferably be used in such an amount that the pH value of the polyurethane emulsion ranges from about 5 to about 7.

By heating the urethane resin obtained by drying the polyurethane emulsion of the present invention at 50° to 200° C, free isocyanate group can be generated from the blocked isocyanate groups. These free isocyanate groups react with the amino groups which are present in the form of an acid salt, with the urethane bond and with the urea bond to form crosslinkages, thereby greatly improving the properties of the urethane resin.

The thus-prepared self-emulsifiable and self-crosslinkable emulsion containing 5 to 50 wt.% of a polyurethane resin, can be incorporated into fibers, non-woven fabrics, papers, leathers, rubber, woods, metals, concrete, gypsum, glass, glass fibers and plastics, or coated or sprayed onto their surfaces and dried, to improve their properties such as surface coating, adhesiveness and hand. Moreover, the emulsion of the present invention can be utilized in the fields of civil engineering and as adhesive agents. The polyurethane emulsion obtained by the present invention, free of emulsifier, is self-emulsifiable. But to further increase the emulsification stability of the emulsion, it is of course possible to add known emulsifiers within a range that does not greatly change the properties of the polyurethane resin.

The invention is further described below with reference to illustrative Examples, but it should be noted that the invention is not limited to these Examples. In the Examples, parts and percent are all by weight unless otherwise stated.

EXAMPLE 1

A. A round bottom flask equipped with a thermometer and a stirrer was charged with 174 parts of a mixture consisting of 2,4- and 2,6-tolylenediisocyanates at a weight ratio of 80 to 20 and 174 parts of methylethyl ketone. There was added, dropwise, over a period of 30 minutes, 87 parts of a methylethyl ketone solution containing 20% of methylethylketoxime through a dropping funnel. The temperature in the flask rose from 17° to 35° C.

Then to the reaction mixture was added 522 parts of methylethyl ketone and the reaction was conducted at 50° C for 30 minutes, thereby to obtain a faintly yellow, transparent and homogeneous methylethyl ketone solution of a blocked isocyanate compound containing one free isocyanate group. The free isocyanate group content in the solution was 3.20%.

B. Separately, 202.5 parts of a dehydrated poly(ethyleneadipate) glycol (hydroxyl value 55.4) was dissolved in 101.7 parts of methylethyl ketone, and to it was added 34.8 parts of a mixture consisting of 2,4- and 2,6-tolylenediisocyanates at a weight ratio of 80 to 20, and the reaction was conducted at 80° C for 3 hours thereby to obtain a urethane prepolymer solution containing 2.45% of free isocyanate groups.

To a separate flask were introduced 3.53 parts of diethylenetriamine and 200 parts of methylethyl ketone which were mixed together, and then there was added dropwise 100 parts of the above urethane polymer solution. The dropwise addition took a period of about 20 minutes, and the temperature of the reaction mixture during this period rose from 21° to 26° C. The reaction was further continued at 50° C for another 30 minutes to obtain a methylethyl ketone solution of a polyurethane-urea-polyamine.

To the polyurethane-urea-polyamine solution was then added 23.3 parts of a solution of the blocked isocyanate compound obtained in step (A) above, and these were reacted at 50° C for 30 minutes, and thereafter there was added 2.91 parts of a 70% glycolic acid aqueous solution and 360 parts of ion-exchanged water to adjust the pH of the system to be about 6.5.

The methylethyl ketone was then distilled off under reduced pressure at 50° C, and then ion-exchanged water was added to adjust the resin content, to obtain a homogeneous, stable and low-viscosity emulsion containing 20% of the resin.

The emulsion was flowed onto and spread on a smooth polytetrafluoroethylene board to obtain a uniform and soft rubbery film. The film after heat-treatment at 120° C for 20 minutes exhibited the following mechanical properties:

| 100% modulus | Tensile strength | Elongation |
|---|---|---|
| 21 Kg/cm$^2$ | 207 Kg/cm$^2$ | 570% |

COMPARATIVE EXAMPLE 1

To the methylethyl ketone solution of the polyurethane-urea-polyamine prepared in the same manner as described in step (B) of Example 1 were directly added 4.84 parts of a 70% glycolic acid aqueous solution and 340 parts of ion-exchanged water, without effecting reaction with the blocked isocyanate compound, thereby to adjust the pH of the system to about 6.5.

Then the methylethyl ketone was distilled off from the system in the same manner as described in Example 1, to obtain a homogeneous emulsion having a resin content of 20%.

The heat-treated film prepared in the same manner as described in Example 1 exhibited the following mechanical properties:

| 100% modulus | Tensile strength | Elongation |
|---|---|---|
| 17 Kg/cm$^2$ | 158 Kg/cm$^2$ | 640% |

Comparison of Example 1 with Comparative Example 1 indicates that the polymer film obtained in Example 1 (process of the present invention) exhibits superior mechanical properties.

The heat-treated film of Example 1 was swollen in dimethylformamide but did not dissolve, whereas, the heat-treated film of Comparative Example 1 dissolved in the dimethylformamide.

EXAMPLE 2

226.7 Parts of a polybutyleneadipate glycol (hydroxyl value 49.5) that was dehydrated at 90° C for 2 hours under reduced pressure in a nitrogen gas stream, was dissolved in 112.1 parts of benzene, and then was introduced to a round bottom flask equipped with a thermometer and a stirrer. To it was added 34.8 parts of a mixture consisting of 2,4-tolylenediisocyanate and 2,6-tolylenediisocyanate at a weight ratio of 80 to 20. The reaction was conducted at 70° C for 2 hours to obtain a homogeneous urethane prepolymer solution containing 2.18% of free isocyanate groups.

Into a separate flask equipped with a stirrer and a thermometer were introduced 4.72 parts of diethylenetriamine and 300 parts of acetone and they were homogeneously dissolved. To the mixture was added, dropwise over a period of 30 minutes, 150 parts of the above urethane prepolymer solution through a dropping funnel. During the period of dropwise addition, the temperature of the reaction mixture rose from 23° to 27° C. The system was then externally heated at 50° C to conduct the reaction for 30 minutes to obtain an acetone-benzene mixed solvent solution consisting of a polyurethane-urea-polyamine. Measurement of a drop of the solution by the infrared absorption spectrum showed no absorption at 2250 cm$^{-1}$ that would be caused by the pressure of free isocyanate groups.

Then to the polyurethane-urea-polyamine solution was added 31.1 parts of a solution of the blocked isocyanate compound obtained in step (A) of Example 1 and they were reacted at 50° for 30 minutes. To the reaction product was added a dilute acetic acid aqueous solution consisting of 2.14 parts of acetic acid dissolved in 300 parts of ion-exchanged water. Acetone and benzene were then distilled off under reduced pressure at 45° C, and the resin content was adjusted by the addition of ion-exchanged water to obtain a stable emulsion having a resin content of 30%. The emulsion showed a pH of about 6.

The film prepared from the emulsion in the same manner as described in Example 1 exhibited the following mechanical properties:

| 100% modulus | Tensile strength | Elongation |
|---|---|---|
| 31 Kg/cm$^2$ | 272 Kg/cm$^2$ | 610% |

COMPARATIVE EXAMPLE 2

To 455 parts of a polyurethane-urea-polyamine solution prepared in the same manner as described in Example 2 was added a dilute acetic acid aqueous solution obtained by dissolving 3.57 parts of acetic acid in 290 parts of ion-exchanged water, and then the acetone and benzene were distilled off under reduced pressure at 45° C, to obtain a stable emulsion of a pH of about 6 and having a resin content of 30%.

The film prepared from the emulsion in the same manner as described in Example 1 showed the following mechanical properties:

| 100% modulus | Tensile strength | Elongation |
|---|---|---|
| 26 Kg/cm$^2$ | 218 Kg/cm$^2$ | 690% |

Comparison of Example 2 with Comparative Example 2 shows that the polymer film obtained in Example 2 (process of the present invention) exhibits superior properties.

EXAMPLE 3

A. A round bottom flask was charged with 147.9 parts of a mixture consisting of 2,4-tolylenediisocyanate and 2,6-tolylenediisocyanate at a weight ratio of 80 to 20, and to which was added 96.05 parts of ε-caprolactam dissolved in 453 parts of methylethyl ketone. The reaction was carried out at 70° C for 1 hour to obtain a methylethyl ketone solution of a blocked isocyanate compound having one free isocyanate group. The free isocyanate group content of the solution was 5.16%.

B. 275.5 parts of a polyoxypropylene glycol (hydroxyl value 162.9) that was dehydrated at 100° C under reduced pressure for 2 hours was dissolved in 204.8 parts of benzene, followed by the addition of 200.0 parts of diphenylmethane-4,4'-diisocyanate and reaction at 75° C for 3 and one-half hours, thereby to obtain a urethane prepolymer solution having a 4.90% of free isocyanate groups.

To a separate flask there were introduced 20 parts of triethylenetetraamine and 400 parts of methylethyl ketone which were mixed well, and then then was added, dropwise over a period of 35 minutes, 200 parts of the above urethane prepolymer solution. The reaction was conducted at 50° C for 40 minutes to obtain a polyurethane-urea-polyamine solution.

To the thus-obtained polyurethane-urea-polyamine solution was added 130 parts of a methylethyl ketone solution of the blocked isocyanate compound obtained in step (A) above and the reaction was conducted at 50° C for 30 minutes. To the reaction mixture was then added 16.5 parts of 35% hydrochloric acid and 650 parts of water, and the solvent was distilled off under reduced pressure at 50° C to obtain a homogeneous and stable emulsion having a resin content of 25%.

The urethane film prepared from the emulsion in the same manner as described in Example 1 exhibited the following mechanical properties:

| 100% modulus | Tensile strength | Elongation |
|---|---|---|
| 16 Kg/cm$^2$ | 139 Kg/cm$^2$ | 770% |

COMPARATIVE EXAMPLE 3

To 620 parts of the polyurethane-urea-polyamine solution prepared in the same manner as described in Example 3 there were added 33 parts of 35% hydrochloric acid solution and 540 parts of water, and the solvent was distilled off under reduced pressure at 50° C, to obtain a homogeneous emulsion having a resin content of 25%.

The urethane film prepared from the emulsion in the same manner as described in Example 1 showed the following mechanical properties:

| 100% modulus | Tensile strength | Elongation |
|---|---|---|
| 11 Kg/cm$^2$ | 87 Kg/cm$^2$ | 830% |

Comparison of Example 3 with Comparative Example 3 indicates that the polymer film obtained in Example 3 (process of the present invention) exhibits superior properties.

EXAMPLE 4

101.6 parts of dehydrated polytetramethylene ether glycol (hydroxyl value 55.2) was dissolved in 50.8 parts of benzene, and there was added 16.8 parts of 1,6-hexamethylenediisocyanate. Reaction was conducted at 75° to 80° C for 7 hours with stirring to obtain a urethane prepolymer solution containing 2.43% of free isocyanate groups.

Separately, into a separate flask were introduced 4.21 parts of diethylene triamine and 240 parts of acetone, and to that was further added 120 parts of the above urethane prepolymer solution, dropwise through a dropping funnel over a period of about 20 minutes. The reaction was conducted at 50° C for 30 minutes to obtain a homogeneous polyurethane-urea-polyamine solution.

To the polyurethane-urea-polyamine solution was added 17.4 parts of a methylethyl ketone solution of the blocked isocyanate compound obtained in step (A) of Example 3 to conduct the reaction at 50° C for 40 minutes. To the reaction mixture were then added 3.46 parts of a 70% glycolic acid aqueous solution and 400 parts of water, and the solvent was distilled off under reduced pressure at 50° C. A homogeneous and stable emulsion was then obtained by adding small amounts of water to adjust the resin content to 20%.

The urethane film prepared from the emulsion in the same manner as described in Example 1 showed the following mechanical properties:

| 100% modulus | Tensile strength | Elongation |
|---|---|---|
| 23 Kg/cm$^2$ | 214 Kg/cm$^2$ | 700% |

EXAMPLE 5

A. 48.5 Parts of Coronate L (containing 12.9% of free isocyanate) produced by Nippon Polyurethane Co. was diluted with 59.4 parts of methylethyl ketone, followed by the addition of 11.3 parts of ε-caprolactam. The reaction was conducted at 70° C for 8 hours to obtain a solution of a blocked isocyanate compound having a free isocyanate group content of 1.73%.

B. Separately, 40.8 parts of dehydrated polyoxytetramethylene glycol (hydroxyl value 55.0) and 20.2 parts of dehydrated polyoxyethylene glycol (hydroxyl value 55.6) were mixed together and dissolved in 31.8 parts of methylethyl ketone, followed by the addition of 13.1 parts of toluenediisocyanate. The reaction was performed at 75° C for 3.5 hours to obtain a urethane prepolymer solution having a free isocyanate group content of 3.64%.

To a separate round bottom flask were introduced 4.73 parts of diethylene triamine and 180 parts of methylethyl ketone, and then there was added 90 parts of the above urethane prepolymer solution, dropwise through a dropping funnel over a period of about 20 minutes, to effect the reaction thereby to obtain a polyurethane-urea-polyamine solution.

Then, to the polymer solution was added 17.4 parts of a solution of the blocked isocyanate compound obtained in step (A) above and the reaction was carried out at 50° C for 30 minutes. To the reaction mixtures was then added 5.70 parts of a glycolic acid aqueous solution of a concentration of 70% and 700 parts of ion-exchanged water, and the solvent was distilled off under reduced pressure at 40° to 50° C.

There was obtained a polyurethane emulsion having an appearance of aqueous solution, and the resin content of which was adjusted to 10%. A urethane film prepared from the emulsion in the same manner as described in Example 1 showed the following mechanical properties:

| 100% modulus | Tensile strength | Elongation |
|---|---|---|
| 8 Kg/cm$^2$ | 148 Kg/cm$^2$ | 810% |

EXAMPLE 6

A. 17.4 Parts of a mixture consisting of 2,4-tolylenediisocyanate and 2,6-tolylenediisocyanate at a weight ration of 80 to 20 was dissolved in 98.6 parts of methylethyl ketone, and to it was added a solution consisting of 7.3 parts of diethylamine dissolved in 41.4 parts of methylethyl ketone, added dropwise over a period of about 20 minutes, while cooling with ice at 0° to 10° C. The reaction was then conducted at 50° C for about 10 minutes to obtain a solution of a blocked isocyanate compound having a free isocyanate group content of 2.55%.

B. 101.6 Parts of dehydrated polyoxytetramethylene glycol (hydroxyl value 55.2) was dissolved in 51.0 parts of methylethyl ketone, followed by the addition of 17.4 parts of a mixture of 2,4-tolylenediisocyanate and 2,6tolylenediisocyanate at a weight ratio of 80 to 20. The reaction was then conducted at 70° C for 4 hours to obtain a urethane prepolymer solution having a free isocyanate group content of 2.45%.

To a separate flask was added 5.3 parts of diethylene triamine dissolved in 300 parts of methylethyl ketone, and to this there was added 150 parts of the urethane prepolymer solution obtained in step (B) above, dropwise over a period of about 20 minutes. The reaction was performed at 50° C for 40 minutes to obtain a polyurethane-urea-polyamine solution. To the thus-obtained polyurethane-urea-polyamine solution was then added, dropwise, 22.0 parts of a solution of the blocked isocyanate compound obtained in step (A) above. The reaction was then conducted at 50° C for 20 minutes, and then there were added 5.81 parts of a 70% glycolic acid aqueous solution and 490 parts of water, and the methylethyl ketone was distilled off under reduced pressure. The resin content was then adjusted by the addition of water, to obtain a homogeneous and stable emulsion having a resin content of 20%.

The urethane film prepared from the emulsion in the same manner as described in Example 1 showed the following mechanical properties:

| 100% modulus | Tensile strength | Elongation |
|---|---|---|
| 26 Kg/cm² | 209 Kg/cm² | 570% |

EXAMPLE 7

A. To 339 parts of the urethane prepolymer solution prepared in the same manner as described in step (B) of Example 1 was added a solution consisting of 19.7 parts of benzophenoneoxime dissolved in 926 parts of methylethyl ketone, dropwise over a period of 1 hour, at a temperature ranging from 28° to 32° C. The mixture was heated at 50° C for 5 hours with stirring to obtain a solution of a blocked isocyanate compound having a free isocyanate group content of 0.33%.

B. 100 Parts of the urethane prepolymer solution prepared in the same manner as described in step (B) of Example 1 was added dropwise with stirring and through a dropping funnel to a mixture consisting of 3.53 parts of diethylene triamine and 200 parts of methylethyl ketone. The dropwise addition required a period of 15 minutes, and the reaction mixture during this period produced heat resulting in the temperature rise of 26° up to 29° C. The reaction mixture was heated and stirred at 50° C for 30 minutes to complete the reaction, thereto to obtain a polyurethane-urea-polyamine solution.

To the thus-obtained polyurethane-urea-polyamine solution was gradually added 229 parts of a solution of the blocked isocyanate compound obtained in step (A) above, and reaction was conducted at 50° C for 40 minutes. To the reaction mixture there were then added 2.91 parts of a glycolic acid aqueous solution of a concentration of 70% and 500 parts of water, and the solvent was distilled off under reduced pressure, followed by the addition of water to adjust the resin content, thereby to obtain a homogeneous emulsion of a resin concentration of 20%.

The urethane resin film prepared from the emulsion in the same manner as described in Example 1 showed the following mechanical properties:

| 100% modulus | Tensile strength | Elongation |
|---|---|---|
| 24 Kg/cm² | 213 Kg/cm² | 630% |

The embodiments of the invention in which an exclusive property or privilege is claimed are defined as follows:

1. A process for preparing an aqueous cationic thermosetting polyurethane emulsion, which comprises:
   1. reacting, in the liquid phase and in a ketone solvent, at a temperature of from −20° to +70° C, (A) isocyanate-terminated urethane prepolymer prepared by reacting organic polyhydroxyl component having a molecular weight in the range of from 200 to 10000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting, in the liquid phase, the reaction product of step 1 with a blocked polyisocyanate having a single free isocyanate group in the molecule, at a temperature of −20° to +70° C for about 0.5 to 2 hours,
   3. adding to the reaction product of step 2 an aqueous solution of an acid to form an emulsion having a pH of about 5 to about 7, and
   4. treating the product of step 3 to remove the organic solvent therefrom and thereby obtaining an aqueous cationic polyurethane emulsion as a final product.

2. A process according to claim 1, in which the reactant (B) includes up to 50%, by molecular equivalent, of diamines, or alkyleneoxide adducts, acrylonitrile adducts or acrylate adducts of diamines.

3. A process according to claim 1, in which the ratio of (b) the total mole number of amino groups containing active hydrogen atoms in the polyalkylene polyamine, to (a) the total mole number of isocyanate groups in said urethane prepolymer is in the range of $$1 < \frac{b}{a} \leq 5.$$

4. A process according to claim 1, in which said polyalkylene polyamine has the formula

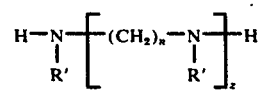

wherein n is an integer larger than one, z is an integer from 2 to 4 and R' is hydrogen, alkyl having one to 4 carbon atoms or hydroxyalkyl having one to 4 carbon atoms.

5. A process according to claim 1 in which said acid is selected from the group consisting of hydrochloric acid, nitric acid, acetic acid, propionic acid, monochloroacetic acid and glycolic acid.

6. A process according to claim 1 in which said acid is glycolic acid.

7. An aqueous anionic polyurethane emulsion prepared by the process of claim 1.

8. A polyurethane molded product prepared by forming the emulsion of claim 7 into a molded product and then heat-treating the product to effect cross-linking.

* * * * *